C. I. ROBINSON.
TREATING SPENT FULLER'S EARTH.
APPLICATION FILED FEB. 26, 1921.
1,403,198.
Patented Jan. 10, 1922.
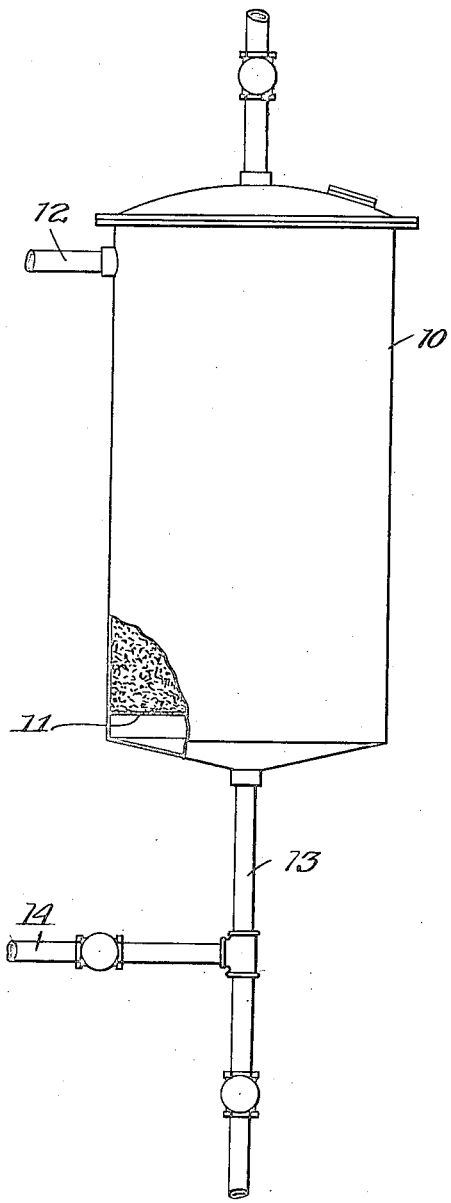
Inventor:
Clarence I. Robinson,

UNITED STATES PATENT OFFICE.

CLARENCE I. ROBINSON, OF NEW YORK, N. Y., ASSIGNOR TO STANDARD OIL COMPANY, OF BAYONNE, NEW JERSEY, A CORPORATION OF NEW JERSEY.

TREATING SPENT FULLER'S EARTH.

1,403,198.    Specification of Letters Patent.    Patented Jan. 10, 1922.

Application filed February 26, 1921. Serial No. 447,964.

*To all whom it may concern:*

Be it known that I, CLARENCE I. ROBINSON, a citizen of the United States, residing at 708 Jewett Avenue, Staten Island, New York, in the county of Richmond and State of New York, have invented a new and useful Improvement in Treating Spent Fuller's Earth, of which the following is a specification.

The present invention relates to the revivification of fuller's earth used in the refining of hydrocarbon oils and will be fully understood from the following description thereof, illustrated by the accompanying drawing in which apparatus suitable for carrying out the invention is diagrammatically shown.

In accordance with the present invention spent fuller's earth, which has been used for the refining of oils by filtration, is subjected to the solvent action of isopropyl alcohol, whereby its revivification is effected and it is made suitable for reuse. The treatment of the oil with the fuller's earth may have been effected either by the usual method of percolating the oil through a bed of the clay or by intimately admixing the clay with the oil to be treated and passing the entire mass through a filter press. The clay exerts a refining and decolorizing action upon the oil, extracting coloring matter, soaps, asphalts and the like therefrom, and in turn becomes loaded with the extracted materials.

I have discovered that isopropyl alcohol of 80% strength by volume or higher has a high efficiency of extraction of the various oil impurities which are contained in the spent fuller's earth used in refining oils, and that by treatment of the spent fuller's earth with such isopropyl alcohol of such concentrations it may be reused for treating oils without substantial loss in efficiency.

In the drawings, a device suitable for the treatment of the spent fuller's earth with isopropyl alcohol in accordance with the present invention is diagrammatically shown. The spent fuller's earth may be charged into the tank 10, where it rests upon a perforated diaphragm 11. Isopropyl alcohol of greater than 80% strength by volume, for example 90%, may be forced into the tank through pipe 12, entering above the body of fuller's earth therein. The alcohol, if desired, may be forced through the bed of clay under pressure. The alcohol after passing through the clay, passes out through discharge pipe 13. After the extraction is completed, steam may be passed through the bed of fuller's earth, being forced in through valved pipe 14. After the isopropyl alcohol contained in the fuller's earth has been driven out by the steam, heated air may be forced through the bed of fuller's earth likewise entering through the pipe 14. The heated air appears to remove moisture from the clay.

Instead of using steam to drive out the isopropyl alcohol remaining in the fuller's earth, any other heating means may be employed. For example, by suitably jacketing the filter or container in which the filtration has taken place, the dry heat may be applied to effect the removal of the isopropyl alcohol. In such case the isopropyl alcohol driven off can be condensed and will not be admixed with large quantities of water, as is the case when steam is used to accomplish this purpose.

The isopropyl alcohol used in washing the clay may be purified by redistillation, and if desired, the redistillation may be carried out simultaneously with the washing, the used alcohol being continuously distilled and the distillate passing directly into the washing tank for reuse.

If desired, the washing of the fuller's earth may be effected in the same tanks in which the filtration of the oil through the fuller's earth occurs. Likewise, in case of filtration of oil containing admixed or suspended fuller's earth through filter presses, the isopropyl alcohol used for washing may be forced through the filter presses after they have become charged with fuller's earth filtered out of the oil.

Although the present invention has been described in connection with the details and specific methods for carrying it into effect it is not intended that these shall be regarded as limitations upon the scope of the invention except in so far as included in the accompanying claims.

I claim:

1. The process of revivifying spent fuller's earth from oil filtration processes which comprises washing the spent fuller's earth with isopropyl alcohol having a strength of at least 80% by volume.

2. The process of revivifying spent fuller's earth from oil filtration processes which comprises passing isopropyl alcohol having the strength of 90% by volume through a body of the spent fuller's earth.

3. The process of revivifying spent fuller's earth from oil filtration processes which comprises passing isopropyl alcohol having a strength of at least 80% by volume through a body of the spent fuller's earth and subsequently heating the fuller's earth to remove the alcohol therefrom.

4. The process of revivifying spent fuller's earth from oil filtration processes which comprises passing isopropyl alcohol having a strength of at least 80% by volume through a body of the spent fuller's earth and subsequently passing steam through the fuller's earth to remove the alcohol therefrom.

5. The process of revivifying spent fuller's earth from oil filtration processes which comprises passing isopropyl alcohol having a strength of at least 80% by volume through a body of spent fuller's earth, passing steam through the fuller's earth to remove the alcohol therefrom and subsequently passing hot air through the fuller's earth to effect its drying.

CLARENCE I. ROBINSON.